G. P. ABORN.
OPERATING MECHANISM FOR LIQUID FLOW METERS AND RECORDERS.
APPLICATION FILED JUNE 17, 1915.

1,237,736.

Patented Aug. 21, 1917.
3 SHEETS—SHEET 1.

Inventor:
George P. Aborn
Attorneys

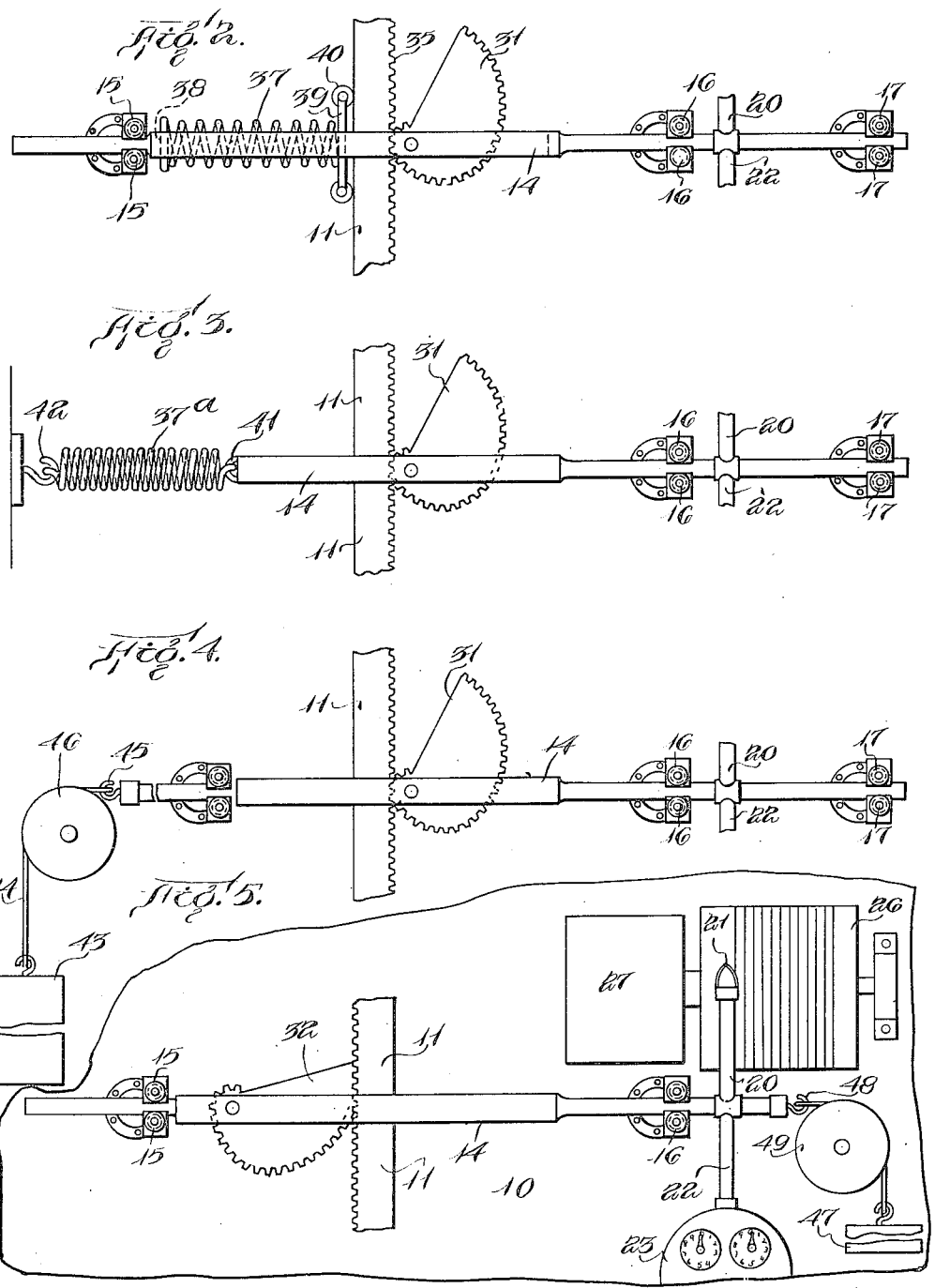

G. P. ABORN.
OPERATING MECHANISM FOR LIQUID FLOW METERS AND RECORDERS.
APPLICATION FILED JUNE 17, 1915.

1,237,736.

Patented Aug. 21, 1917.

Inventor:
George P. Aborn
by Wright Brown Quinby & May
Attorneys

UNITED STATES PATENT OFFICE.

GEORGE P. ABORN, OF BROOKLINE, MASSACHUSETTS.

OPERATING MECHANISM FOR LIQUID-FLOW METERS AND RECORDERS.

1,237,736.  Specification of Letters Patent.  Patented Aug. 21, 1917.

Application filed June 17, 1915. Serial No. 34,655.

*To all whom it may concern:*

Be it known that I, GEORGE P. ABORN, a citizen of the United States, and resident of Brookline, in the county of Norfolk and State of Massachusetts, have invented certain new and useful Improvements in Operating Mechanism for Liquid-Flow Meters and Recorders, of which the following is a specification.

The present invention relates to an apparatus or device for measuring the momentary rate of flow of liquids, or recording the total amount of liquid flowing in a definite period of time, or for both measuring and recording the rate of flow and the quantity passing in a given time. The present invention has for its object to provide an improved simple and accurate means for causing the indicator or recorder of the apparatus to be moved in correspondence with changes in the rate of flow of the liquids.

Measuring and recording devices have heretofore been produced in which the indicating or recording part of the instrument is controlled either by the height of water passing over a weir, or by the pressure in the throat of a Venturi tube. The improvement in which my present invention resides is adapted for instruments operated by the flowing liquid in either of the ways above indicated.

The invention has for its further object to provide a novel and simple mechanism, particularly adaptable for the purpose above noted, and adaptable for other uses as well, for transforming uniform motion of a driving or actuating element into variable motion of a follower or driven element, and at the same time causing the movement of the follower to be related to that of the actuator according to a known law.

The invention consists essentially in a motion transmitting mechanism adaptable for the purposes above indicated, comprising the elements hereinafter described and claimed, various embodiments of which mechanism are shown in the accompanying drawings, in which, Figure 1 is an elevation of an instrument or device arranged for indicating the rate and measuring the amount of liquid flow, in which one of the embodiments of the hereinafter described and claimed invention is exhibited.

Fig. 2 is a detail view of a modification or modified embodiment of the invention adapted to be used in the apparatus shown in Fig. 1.

Fig. 3 is a similar view of still another modification.

Fig. 4 is a similar view of a third modification.

Fig. 5 is a similar view of a fourth modification.

The same reference characters indicate the same parts in all the figures.

Figure 1:
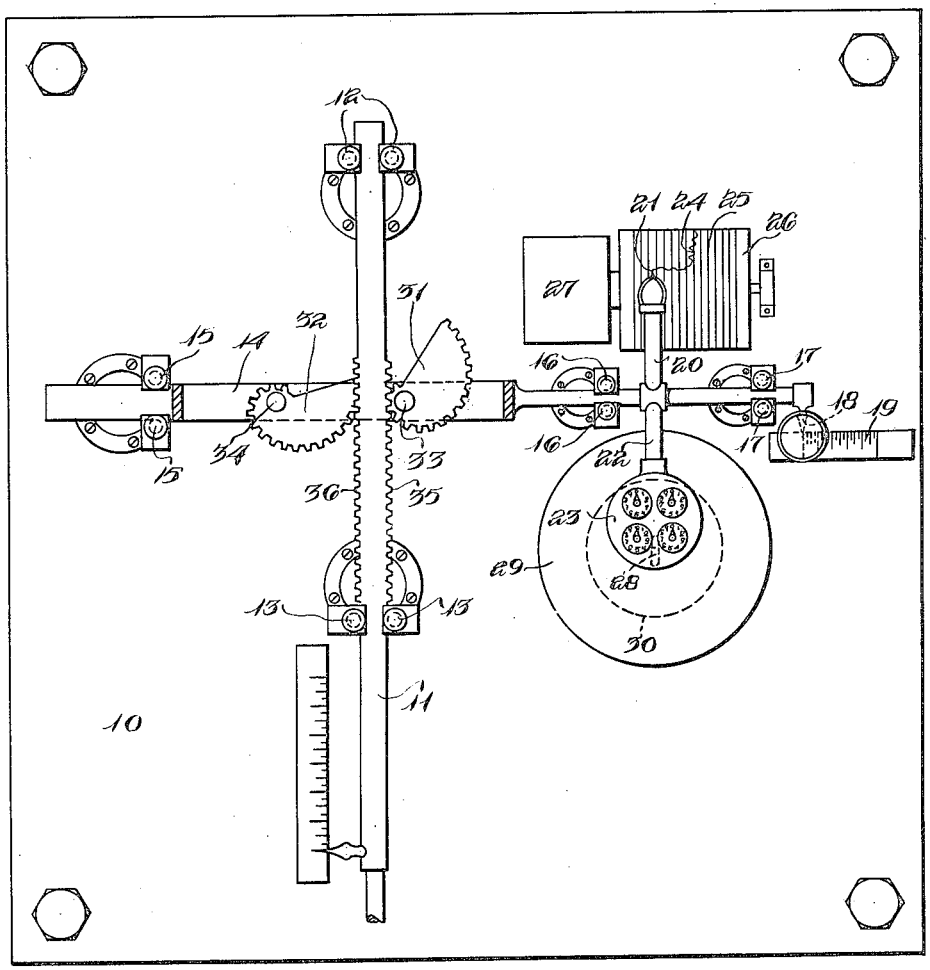

Referring to Fig. 1, 10 represents any sort of a backing or support which may form part of the entire instrument and is adapted to support the operating parts. 11 represents a rod which is freely movable endwise and is guided by antifriction guiding means 12—12 and 13—13 suitably mounted upon the support 10 in a position such as to permit free and unimpeded movement of the rod. Preferably the rod is mounted in a vertical position, although it may be otherwise mounted without departure from the invention. This rod is connected either directly or indirectly to a float which floats either in the liquid of which the flow is to be measured, when such liquid is caused to flow over a weir, or in liquid contained in a manometer chamber connected to a Venturi tube. Or instead of the float any other actuator may be mounted which is movable in proportion to variations in head of the liquid passing over the weir, or in the pressure of the liquid. In its simplest form the rod 11 is connected directly to the float and moves upwardly and downwardly as the float rises and falls with fluctuation in the height of the liquid level, but the invention is not limited to this particular construction or arrangement.

14 represents a carriage which is supported and guided by guides 15—15, 16—16, 17—17, so that it may move back and forth in a direction transverse to the line of movement of the rod 11, and can move in only those directions. The guiding and supporting means are constructed and arranged to offer as little resistance as possible to the movement of the carriage. Said carriage carries a pointer or index 18 which coöperates with a scale 19, an arm 20 provided with a marker 21, and an arm 22 on which is mounted an integrator 23. The marker 21 is adapted to trace a diagram indicated at 24 on a record sheet 25, which is carried by a drum 26, the latter being rotatably supported on the support 10 and driven at a uniform rate of speed by a motor 27, which is preferably a spring driven clock movement. The integrator or counter 23 is provided with the usual dials and pointers which are operated by the driving wheel 28, which is mounted on the casing of the integrator and makes contact at its periphery with a driving disk 29, which is also rotated at uniform speed by a clock work or other motor indicated at 30. The path in which disk 28 of the integrator is constrained to move when the carriage moves, crosses the center of the driving disk 29, and the disks 28 and 29 are relatively so located that when there is no flow and the rod 11 is at its lowermost position, the disk 28 makes contact with the disk 29 at the center of the latter, wherefore no movement is given to the indicating elements of the integrator.

The pointer, marker, recording drum, and integrator or counter, with its driving disk, are not my invention and I make no claim to the same. These elements are shown here as necessary parts of the indicating and recording end of the instrument to which my invention is adapted. The invention consists primarily in a novel means for transmitting motion from the rod or bar 11 to the carriage 14, and further in so forming and arranging the motion-transmitting means that equal increments in the rate of flow of the liquid will produce equal increments in the movement of the indicating members (under which term I include any one or all of the three indicators hereinbefore described, namely, the pointer 18, the marker 21, and the counter 23) although the corresponding movements of the rod may not have this regular progression.

The form of such motion-transmitting means shown in Fig. 1 consists of two gear elements 31 and 32, which are pivotally mounted on the carrier at opposite sides of the rod 11 on the pivot studs 33 and 34, respectively. The teeth of these gear elements, which are peripherally arranged, mesh with racks 35 and 36, respectively, which are carried by the rod 11. The pitch lines of the teeth on the gear elements 31 and 32 are eccentric to the respective pivots of said elements and have a generally spiral form, the exact shape of which depends upon the equation of flow of the liquid. The positions and formation of the gear elements are such that, as the rod 11 rises, for instance, and the gear element 31 is rotated in right hand rotation, the progressively increasing eccentricity of that element causes the element and carriage to be moved toward the right with respect to the drawing. The gear element 32 is complemental to the element 31 to this extent: As it is rotated simultaneously with the element 31 in left hand rotation while the element 31 turns in right hand rotation, its periphery recedes to the same extent that the periphery of the element 31 advances with respect to the rod, thus permitting the above described movement of the carriage. The element 32 acts positively to move the carriage toward the left, (with respect to the drawings) when the rod 11 is lowered. These gear elements may be described as being so constructed and arranged that in any position of the rod and the carriage the sum of the radial distances (pitch line distances) from the axes of these two gears to the rod is equal to the distance between the axes of the gears less the distance between the pitch lines of the racks 35 and 36. Where the racks are parallel, as in this case, all such sums are equal.

It will be appreciated that the gear elements 31 and 32 are, in effect, cams which are engaged peripherally with the rod and are turned through such engagement by endwise movement of the rod, whereby they effect a movement of the carriage which may be made of any desired amount in proportion to the movement of the rod, dependent on the contour of the cams. The teeth of the gear elements and of the racks constitute means for preventing slip between the actuator rod and the cams, and for making the mechanism exactly positive.

In Fig. 2 there is shown a modification of the transmission mechanism in which the element 32 and rack 36 are omitted, and a spring 37 is provided to hold the element 31 in contact with the rack 35. This spring presses at one end against a shoulder 38 on the carriage and reacts at the other end against an abutment 39 which has antifriction rolls 40 bearing against a smooth surface on the actuator rod. Spring 37 evidently provides a yielding means for maintaining the cam gear and rack in mesh, taking up looseness, and returning the carriage at the rate permitted by the cam gear when the actuator rod descends. In all other respects this form of the invention is the same as that shown in Fig. 1, and the same reference characters are used on the corresponding parts.

Fig. 3 shows a modification like that of Fig. 2 with this exception, that the spring 37ª reacts against a fixed abutment instead of against the actuator rod 11. Said spring is provided with hooks or loops at its opposite ends connected respectively with an eye 41 on the carriage and an anchorage 42 suitably fixed on the support 10 or other fixed part.

Fig. 4 shows a variation of the preceding modifications in which the spring 37, and respectively 37ª, is replaced by a weight 43 hung from the carriage by the means of a cord or other flexible connector 44 which is attached to a hook 45 on the carriage and passes around a guide roll 46. The function of the weight is the same as that of the springs previously described.

Fig. 5 shows what is in effect a reversal of the arrangement shown in Fig. 4, or it may be considered as a modification of Fig. 1 in which the gear cam 31 is omitted and the element 32 retained. A weight 47 is connected with the carriage by the hook 48 at the side of the actuator bar 11 opposite to that on which the gear element 32 is located, and passes over a guide pulley 49. A spring may be substituted to perform the function of the weight 47 in essentially the same manner that springs 37 and 37ª are arranged to effect the result accomplished by the weight 43.

Figure 6:
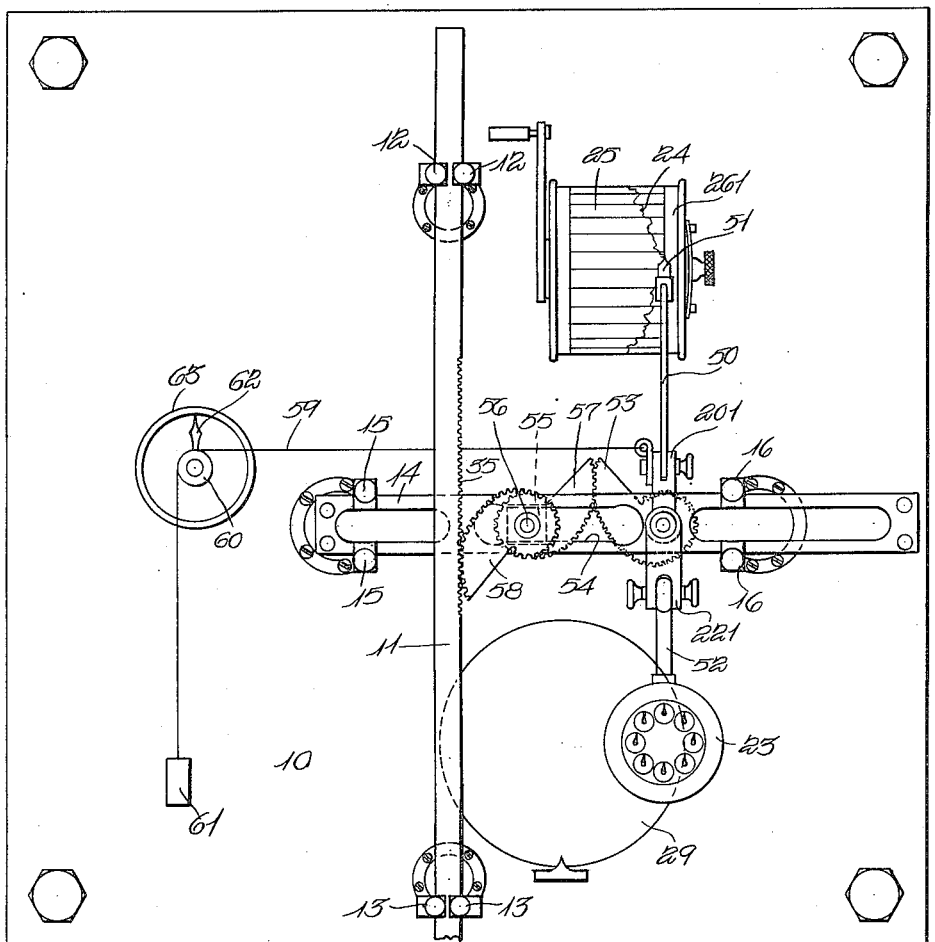
Fig. 6 is an elevation similar to Fig. 1 showing a modification involving a multiplying transmission mechanism.
Figure 8:
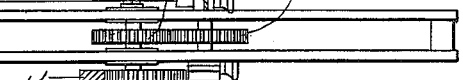
Fig. 8 is a plan view of the mechanism shown in Fig. 7.
Figure 7:
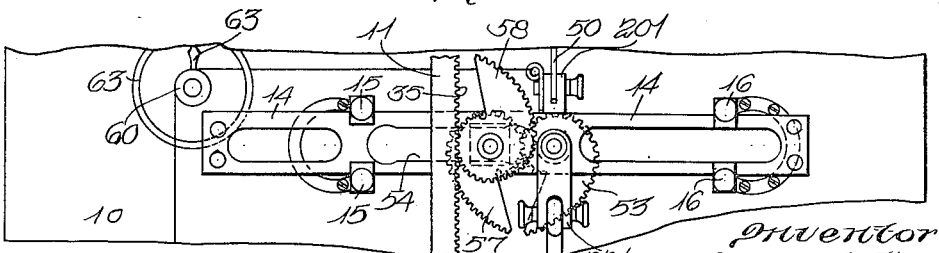
Fig. 7 is an elevation showing essentially the mechanism of Fig. 6 in a different position.

Figs. 6, 7, and 8 represent a modification of the transmission mechanism designed to increase the motion given to the driven member. In these figures the parts which are essentially the same as corresponding parts shown in Fig. 1 are given the same reference characters. The driven member is a carriage 14 mounted and guided essentially as shown in Fig. 1 and having arms 201 and 221, to the first of which is clamped an indicator 50 carrying a marker 51, and to the other of which is suspended an arm 52 carrying the integrator or counter 23. A cam 53 is pivoted to the carriage 14 in any manner suitable for permitting its rotation but preventing it from otherwise shifting with respect to the carriage. Said carriage is also provided with a guideway 54 in which is mounted to slide a traveler 55 having bearings wherein is mounted a shaft 56 having fixed upon it cams 57 and 58. The three cams mentioned are provided with means for preventing slip, such as gear teeth on their peripheries, and the cams 53 and 57 mesh or engage with one another, while the third cam 58 engages the rod 11 by meshing with the rack 35 thereon. A flexible cord or ligament 59 is connected with the arm 201 and passes over a pulley 60, supporting a suspended weight 61. The pulley 60 carries or otherwise operates a pointer 62 co-acting with a dial 63. The function of the weight is to maintain the cam 53 in contact with the cam 57 and the cam 58 in contact with the rack 35, taking up looseness and backlash between these parts and causing the carriage to move to the left, with respect to the drawings, whenever permitted to do so by descent of the rod 11. The cams 57 and 58 are opposed, that is, located on opposite sides of the axis of shaft 56 and the cam 53 is opposed to the cam 57. By means of the cams 58 and 57 the movement of the rod is transmitted to the cam 53 indirectly, and by the latter to the carriage with the result of giving a greatly increased movement to the latter over what would be imparted if the rack engaged directly with the cam 53. Where the cams are all alike, as here, the resultant movement of the carriage is three times that which would be imparted by direct action of the rack upon the cam 53. It will be at once apparent that as the rod 11 rises and descends it rotates the cams 58 and 57 as a unit, imparting movement to cam 53 in the opposite direction to that of the first two cams. In these movements the traveler 55 is moved relatively away from and toward the rod and the carriage is correspondingly moved relatively to both the traveler and the rod. The traveler then slides on the guideway 54. The character of the motions is indicated clearly by a comparison of Figs. 6 and 7, which show the transmission mechanism in two extreme positions. The pulley 60 or corresponding mechanism which operates the pointer 62, is so proportioned that the pointer is caused to make a complete circuit of the dial in the shifting of the carriage from one extreme position to the other.

Figure 9:
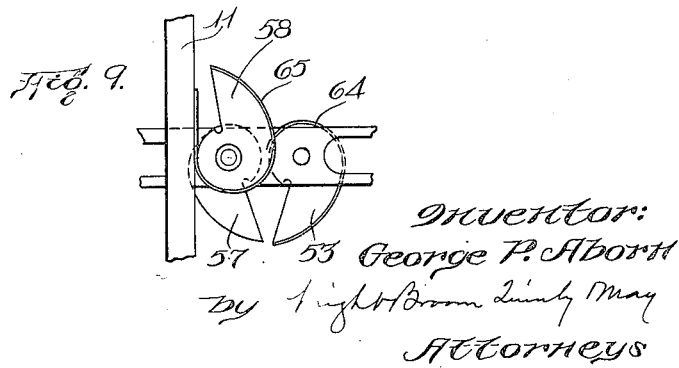
Fig. 9 is a detail elevation illustrating a modification in the structure of the cams.

It is not essential that the cams should be gear elements, since I may provide any means other than the peripheral teeth which may be suitable for preventing slip between cams. One such other means suitable for the purpose is shown in Fig. 9 and consists of a strap 64 fastened at one end to the tip of the cam 53 and at its opposite end to the base of the cam 57, and a strap 65 similarly connected to the cam 58 and the rod 11. These straps being inextensible, but flexible, transmit motion from the rod to the first cam and from the second to the third cam without slip. Other means, such as a facing of frictional material on the peripheries of the cam may be employed as an equivalent of the above. It is understood, of course, that the above described equivalents may be equally well applied to the forms of the invention shown in Figs. 1 to 5.

In each principal modification of the invention, that is, in the case where the cam carried by the driven member is indirectly engaged and rotated by the driver, as well as in the case where such cam is directly operated by the driver, said cam is given a movement of rotation by the driver and is caused to react against the latter, in the first case through the intermediate cams, and in the second case directly, and in so reacting, by its eccentric periphery it causes displacement of its pivot and thereby of the driven member or carriage. It is consequently to be borne in mind that those of the following claims which recite this arrangement and mode of operation in general terms are not restricted to either main form of the invention.

It will be understood that by referring in this specification and in the following claims to the "periphery of the cams," I have not intended to imply a restriction of the invention to a cam in which the operative surface is the outer edge. The term "periphery" as here used is intended to embrace any cam surface however formed and located which is capable of securing essentially the effects herein described.

For the purposes of this application it may be considered that the rod 11 is an actuator or driver movable endwise in a direction which, in the illustrated embodiment of the invention, is vertical, but which may be any other direction; which driver acts upon a follower or driven member through the medium of one or more eccentric gear elements or cams pivoted upon the follower in such a way that the movement of the actuator positively causes rotation of the gear element or cam, thereby causing the pivot of the gear or cam to be crowded away from the actuator, and the follower to be correspondingly moved.

What I claim and desire to secure by Letters Patent is:

1. A motion-transmitting device comprising an endwise movable driving rod, a carriage movable transversely to the movement of said rod, a cam rotatably mounted upon said carriage, said cam being constructed and arranged to be rotated by movement of said rod and to react against the same, the cam having an eccentric reacting surface whereby its rotation and reaction causes shifting of the carriage.

2. A motion-transmitting mechanism comprising a driver movable in a given path, a driven member movable in a path transverse to that of the driver, an eccentric cam element pivoted to the driven member and otherwise immovable with respect thereto, and means whereby said driver when moved applies a rotating impulse to the periphery of said cam, the latter being arranged to react upon the driver through its periphery and by such reaction to displace the driven member.

3. A motion-transmitting mechanism comprising a driver movable in a given path, a driven member or carriage movable in a different path, a cam having an eccentric periphery pivoted to said carriage, a second cam having an eccentric periphery engaged in rotation-causing engagement with the periphery of the first cam and mounted capably for both rotation and translation with respect to said carriage, and a third cam having an eccentric periphery rigidly connected to the second cam and peripherally engaged with the driver.

4. A motion-transmitting mechanism comprising a driver movable in a given path, a driven member movable in a different path otherwise than parallel to that of the driver, two oppositely disposed and rigidly connected cams mounted on said carriage capably for both rotation and translation, one of said cams being peripherally engaged with the driver in such relation that rotation is imparted thereto by movement of the driver, and a third cam carried rotatably by the carriage and engaged in rotation-producing relation with the second of the rigidly connected cams, whereby movement of the driver imparts rotation indirectly to the third cam and causes displacement of the carriage by the reactions of the cams upon one another and upon the driver.

5. Operating mechanism for liquid flow meter, comprising an indicator, a carriage on which said indicator is mounted, said carriage being guided to move in a prescribed path, a driving bar guided to move across said carriage and across the path of movement of the latter, said bar being variable as to its position in proportion to the rate of flow of the liquid measured and a cam carried by said carriage with provision for rotation relatively thereto and being formed with an eccentric periphery in rolling contact with said driver bar.

6. Operating mechanism for liquid flow meter, comprising an indicator, a carriage on which said indicator is mounted, said carriage being guided to move in a prescribed path, a driving bar guided to move across said carriage and across the path of movement of the latter, said bar being variable as to its position in proportion to the rate of flow of the liquid measured and a cam carried by said carriage with provision for rotation relatively thereto and being formed with an eccentric periphery in rolling contact with said driver bar, and means associated with cam and driver bar for preventing slipping of one relatively to the other and insuring extent of peripheral movement of the cam equal to the extent of linear movement of said bar.

7. Operating mechanism for liquid flow meter, comprising an indicator, a carriage on which said indicator is mounted, said carriage being guided to move in a prescribed path, a driving bar guided to move across said carriage and across the path of movement of the latter, said bar being variable as to its position in proportion to the rate of flow of the liquid measured, a cam having teeth on its periphery carried by said carriage and rotatable relatively thereto, being arranged with its periphery in rolling contact with said driver bar, and the bar having teeth meshing with the teeth of said cam.

8. A motion-transmission mechanism for a liquid flow meter, comprising the combination with an actuator movable rectilinearly in opposite directions and operable by variations in the head or pressure of the flowing liquid through distances proportional to such variations, and a transversely movable indicator carriage, of a cam rotatably mounted on the carriage with its periphery in rotation-causing contact with a portion of said actuator, said cam having its periphery in the form of a curve representing the equation of flow.

9. A meter comprising a bar movable endwise and operable by the liquid of which the flow is to be measured, an indicator-operating member movable transversely to the direction of movement of said bar, and a cam pivoted to the said member having its periphery in the form of a curve representing the equation of flow and arranged in rolling contact either directly or indirectly with said bar for transmitting motion therefrom to said member.

10. A meter comprising a bar movable endwise, an indicator-operating member movable transversely to said bar, a cam carried by said member with ability for rotation and translation relatively thereto having peripheral engagement with the bar and a second cam pivoted to said member and arranged to be rotated by said first cam, the first cam reacting against the bar and the second cam against the first cam to produce movement of the said member.

11. In a meter, a driving bar, an indicator-operating member, a cam pivoted in unchanging location upon said member having an eccentric periphery, and an intermediate means rotatably and translatively movable on said member having peripheral driving engagement with the cam and also with said driving bar, and being eccentric in outline.

12. A liquid flow meter comprising a bar movable endwise and operable by the liquid of which the flow is to be measured, an indicator operating bar, movable transversely to the direction of movement of the first bar, and a cam pivoted to the second bar having its periphery in the form of a curve representing the equation of flow and arranged in rolling contact with the first bar for transmitting motion from the latter to the former.

13. In a meter of the character described, a motion-transmitting device comprising an endwise movable bar, a carriage movable in a direction transverse to that of the movement of the bar, and a cam pivoted to said carriage having a periphery which is eccentric to its pivotal axis and is arranged in rolling contact with a portion of said bar, whereby movement of said bar transmits movement to said carriage.

14. In a meter of the character described, a motion-transmitting device comprising an endwise movable bar, a carriage movable in a direction transverse to that of the movement of the bar, a cam pivoted to said carriage having a periphery which is eccentric to its pivotal axis and is arranged in rolling contact with a portion of said bar, and means acting to retain said cam in contact with said bar.

15. In a meter of the character described, a motion-transmitting device comprising an endwise movable bar, a carriage movable in a direction transverse to that of the movement of the bar, and a cam pivoted to said carriage having a periphery which is eccentric to its pivotal axis and is arranged in rolling contact with a portion of said bar, whereby movement of said bar transmits movement to said carriage and the interengaging portions of said bar and said cam being provided with means to prevent slipping of one relatively to the other.

In testimony whereof I have affixed my signature.

GEORGE P. ABORN.